United States Patent
Abend

[11] Patent Number: 5,844,047
[45] Date of Patent: Dec. 1, 1998

[54] SINGLE COMPONENT, HEAT CURING COMPOSITIONS WHICH ARE STABLE WHEN STORED AT ROOM TEMPERATURE AND WHICH COMPRISE POLYMERS CONTAINING ANHYDRIDE GROUPS AND POWDERED CROSSLINKING AGENTS, AND THEIR METHOD OF MANUFACTURE AND USE

[75] Inventor: Thomas P. Abend, St. Gallen, Switzerland

[73] Assignee: Ciba Specialty Chemicals Corporation, Tarrytown, N.Y.

[21] Appl. No.: 838,765

[22] Filed: Apr. 10, 1997

Related U.S. Application Data

[63] Continuation of Ser. No. 392,798, filed as PCT/CH94/00136 Jun. 28, 1994, published as WO95/02637 Jan. 26, 1995, abandoned.

[30] Foreign Application Priority Data

Jul. 16, 1993 [CH] Switzerland ............... 2145/93

[51] Int. Cl.$^6$ ........................................ C08F 8/14
[52] U.S. Cl. ............. 525/327.7; 525/186; 525/327.4; 525/327.6; 525/379; 525/380; 525/381; 525/383; 525/384; 525/386
[58] Field of Search .................. 525/186, 327.4, 525/327.6, 327.7, 379, 380, 381, 382, 383, 384, 386

[56] References Cited

U.S. PATENT DOCUMENTS 4,145,321 3/1979 Lee ............................................ 260/27

FOREIGN PATENT DOCUMENTS 0994907 of 1965 United Kingdom .

*Primary Examiner*—Edward J. Cain
*Attorney, Agent, or Firm*—David R. Crichton

[57] ABSTRACT

The invention concerns new, liquid compositions, stable in storage at room temperature, based on polymers containing acid anhydride groups as a binder, said compositions crosslinking under the action of heat and characterized by containing dispersed, solid, powdered, anhydride reactive crosslinker which, through the application of heat, can crosslink the binder containing anhydride groups under solidification. The features of these compositions are their low toxicity, low crosslinking temperatures and good mechanical strength of the crosslinked product. The invention also concerns a method of their manufacture and their use as heat curing coatings, potting compounds, sealants and adhesives.

21 Claims, No Drawings

SINGLE COMPONENT, HEAT CURING COMPOSITIONS WHICH ARE STABLE WHEN STORED AT ROOM TEMPERATURE AND WHICH COMPRISE POLYMERS CONTAINING ANHYDRIDE GROUPS AND POWDERED CROSSLINKING AGENTS, AND THEIR METHOD OF MANUFACTURE AND USE

This application is a continuation of application Ser. No. 08/392,798, filed as PCT/CH94/00136 Jun. 28, 1994, published as WO95/02637 Jan. 26, 1995, now abandoned.

The invention concerns liquid heat curing compositions which are stable when stored at room temperature, and a method for their manufacture and use.

Heat curing, single component compositions for bonding, sealing, coating and casting are currently in use throughout a wide spectrum of industry. These compositions are applied at room temperature as a liquid, and are crosslinked through the action of heat at an elevated temperature. It is mainly low to high viscous mixtures based on isocyanates, isocyanate prepolymers, epoxides, low number average molecular weight (Mn) acrylates, polyesters containing peroxide and monomers, and low molecular weight (Mn) elastomers containing sulphur or peroxide which are of significance in industry. For various reasons, there are nowadays great reservations in using most of these mixtures, which employ low molecular weight (Mn) and, at curing temperatures, volatile reaction partners, due to their acute or chronic toxicity, ecotoxicity or the allergic reactions which they cause.

There is therefore a great requirement for toxilogically safe, heat curing compositions for casting, sealing, bonding and coating. Since such compositions are also used for large-scale technical use, only reactive systems can be considered which employ generally available raw materials which can be manufactured on an industrial scale employing simple manufacturing steps.

Great efforts have already been made to develop elastic compositions based on polymers containing anhydride groups, and various crosslinking agents as technically useable binders.

DE 2 205 209 describes mixtures of Diels-Alder reaction products of maleic acid anhydride to short chain diolefins and polybutadiene containing terminal position hydroxyl groups which were brought to reaction at an elevated temperature. The mixture of all components has proved to be unstable in storage at room temperature, however, particularly in a catalyzed state.

The compositions described in DE 3 436 556, based on polybutadienes containing anhydride groups and polybutadienes containing terminal hydroxyl groups, are indeed stable at room temperature in the uncatalyzed state, but require very long curing times at an elevated temperature, and lead to products exhibiting very unsatisfactory mechanical properties.

DE 3 380 895 describes the curing of maleinized polybutadiene with liquid polyols which actually takes place at room temperature, without any reference to heat curing mixtures which use powdered polyols, stable in storage at room temperature.

In DE 2 758 222, heat curing of a mixture of maleinized polybutadiene with a complex of 4,4'-methylendianiline and sodium chloride is described. The presence of sodium chloride in the final product is a disadvantage, as is the mutagenic effect of methylendianiline in the non-reacted mixture.

A copolymer is described in DE 3 913 407 which, in addition to anhydride groups, also contains hydroxyl and epoxy groups and can be cured at temperatures above 140° C. The reaction temperature can indeed be reduced through the addition of catalysts, but then storage stability at room temperature will be lost. The application also states that the high molecular weight (Mn) copolymers described can only be processed in solution.

The purpose of the invention is the manufacture of new, single component compositions which crosslink at elevated temperatures and which are stable during storage in ambient conditions, and which do not possess the disadvantages of the state of the art. This purpose is achieved by the compositions.

Accordingly, the subject of the invention concerns storable compositions, stable at room temperature which crosslink at an elevated temperature through the effect of heat, and which preferably comprise:

(a) polymers containing anhydride groups and
(b) solid, powdered, multi-functional anhydride-reactive crosslinkers dispersed in these polymers.

These crosslinkers are inactive in ambient conditions, i.e. not dissolved in the polymer. At elevated temperatures and in a molten, dissolved and therefore active state, they are in a position to react with the anhydride groups of the polymer by means of crosslinking.

The polymers (a) which, as binders, form the basis of these compositions are polymers or copolymers which are liquid at room temperature and contain acid anhydride groups and which possess a number average molecular weight Mn between 500 and 50 000 Daltons. Polymers are preferred which contain a molecular weight Mn of 2000 to 30,000 Daltons and which contain an average of 1.5 to 10, preferably 1.8 to 8 anhydride groups per molecule. Expressed as an acid number, these polymers have a value of 15 to 150 mg KOH/g, preferably 20 to 100 mg KOH/g (determined with a water-free alcoholic potassium hydroxide solution, which gives a semi-ester).

The acid anhydride groups can be distributed statistically or regularly in the molecule or in the terminal position. The introduction of the acid anhydride groups can be achieved through copolymerization, through reaction with terminal reactive groups, through addition of unsaturated anhydrides onto individual or conjugated double bonds or by means of graft reactions.

Examples of such crosslinkable polymers (a) are: copolymers with olefinic unsaturated monomers such as copolymers of maleic acid anhydride or itaconic acid anhydride with olefins, dienes, vinyl compounds, vinyl aromatic compounds, vinyl esters, vinyl ethers, acrylic and methacrylic compounds, addition products of unsaturated anhydrides on individual or conjugated double bonds are preferable, for example those on polymers of butadiene or isoprene with cyclopentadiene, styrene, acrylonitrile, olefins with up to 12 C-atoms, on esters of unsaturated fatty-acids, on terpenes or on liquid, unsaturated decomposition products of high molecular weight Mn elastomers such as natural rubber, styrene butadiene rubber, SBS and SIS thermoplastic rubber. Particulary preferred are reaction products of maleic acid anhydride on polymers or copolymers of polybutadiene. The addition of the unsaturated anhydride can also be carried out on partially hydrogenated polymers, or the hydrogenation of excess double bonds can be undertaken catalytically after the anhydride addition.

Graft products which are obtained through the addition of olefinic unsaturated anhydrides on liquid polymers and copolymers, mostly under the action of radicals such as peroxides and azo compounds. Particularly preferred is the addition of unsaturated anhydrides on EPDM, EVA and polyalphaolefins.

Preferred liquid polymers containing acid anhydride groups (a) are also ester anhydrides, in particular polymeric esteranhydrides, thioesteranhydrides or amide anhydrides of polyhydroxyl compounds, polymercapto compounds, of polyamines with trimellitic acid anhydride, pyromellitic acid dianhydrides, benzene tetracarboxylic acid dianhydride, benzophenone tetracarboxylic acid dianhydride.

The binders can, in an advantageous way, also be blends of crosslinkable polymers. It can be of advantage if the blends comprise polymers containing anhydrides, said polymers possessing varying average molecular weight Mn and optionally with a varying number of anhydride groups per molecule. Alternatively, the blends can comprise polyfunctional polymers containing anhydride groups and monofunctional polymers containing anhydride groups, especially with polymers containing low molecular weight Mn monofunctional anhydride groups. The mixture must contain on average preferably at least 1.5 anhydride groups per molecule.

The preferred liquid polymers can, in addition to containing anhydride groups, also contain other functional groups such as alkoxysilyl groups or carboxyl groups.

Representatives of the powdered crosslinkers (b) according to the invention include:

b1) solid di- or polyols with primary or secondary hydroxyl groups, b2) solid di- or polyamines, b3) solid di- or polyepoxydes, b4) compounds which carry different anhydride reactive groups, b5) and mixtures thereof, with a melting point above 60° C., preferably above 80° C., most preferably above 100° C., optionally after surface inactivation of the anhydride-reactive groups of the solid crosslinker with acylating or alkylating compounds. It should thus be ensured that the crosslinkers can only react with the binder at temperatures of 80° C. and above.

The particle size of the crosslinker lies within a range of 0 to 500μ, preferably 0 to 200μ, and most preferably 0 to 100μ.

In ambient conditions, these crosslinkers are inactive and not soluble in the polymer. At elevated temperatures they will melt, or dissolve and react with the anhydride groups of the polymer.

Examples of solid di- or polyhydroxy compounds b1) which contain primary or secondary hydroxyl groups and which melt at temperatures above 60° C. are mannite, sorbite, sucrose, lactose, erythrite, pentaerythrol, di-pentaerythrol, tri-pentaerythrol, solid pentaerythrol derivatives with ester or ether groups (with on average at least two free hydroxyl groups), neopentylglycol, bis-(2-hydroxyethyl)-hydroquinone, oxethylated bisphenol A, terephthalic acid-bis-oxethylamide, tris-(2-hydroxyethyl) isocyanurate, N,N'-bis-(2-hydroxyethyl)-piperazine, solid polyester containing hydroxyl groups, reaction products of di- or polyisocyanates with short chain dioles or amino alcohols, solid polymers or copolymers containing hydroxyl groups such as semi-hydrolyzed co-ethylene vinylacetate, copolymers of (meth)acrylic acid esters with hydroxyethyl- or hydroxypropyl(meth)acrylate, cellulose-ester or -ether, semi-hydrolyzed polyvinyl acetate (polyvinyl alcohol containing acetyl groups), polyvinyl acetal containing hydroxyl groups, PVC-copolymer containing hydroxyl groups.

Examples of solid di- or polyamines b2), useable according to the invention and which melt at temperatures above 60° C., are: sterically hindered, aromatic diamines such as 3,3',5,5'-tetramethyl-4,4'-diaminodiphenylmethane, 3,3',5,5'-tetraethyl-4,4'-diaminodiphenylmethene, 2,2'-dichloro-3,3',5,5'-tetrethyl-4,4'-diaminodiphenylmethane, ethyleneglycol-di-p-aminobenzoic ester, trimethylenglycol-di-p-aminobenzoic ester, 4,4'-diaminobenzophenone, 4,4'-diaminobenzanilide, 3,3'- and 4,4'-diaminophenylsulphone, N,N'-di-anilino-urea, piperazine, solid reaction products of short chain diamines on diisocyanate or polyisocyanate, solid reaction products of short chain mono- and diamines on diepoxides or polyepoxides, solid reaction products of monomeric anhydrides and polyamines (inner salts) such as the product of the reaction of phthalic acid anhydride and diethylentriamine (epoxy hardener HT 939 from Ciba-Geigy AG), solid neutralizing products of di- or polyamines and aliphatic monocarboxylic acids.

The above solid reaction products of di- or polyamines on isocyanate, epoxydes or monoanhydrides, or the neutralization products of the di- or polyamine with aliphatic monocarboxylic acids can also be produced in situ in a plasticizer or non-reactive solvent as an intermediate product, prior to mixing with the polymers containing anhydride groups.

Examples of solid compounds containing epoxyde groups b3) which melt above 60° C. are tris-glycidyl-isocyanurate, N,N,N',N'-tetraglycidyl ether of 4,4'-diaminodiphenylmethane, solid condensation products containing epoxide groups and based on a bisphenol-A-diglycidyl ether.

Examples of solid compounds b4), which melt above 60° C. and which contain in the molecules different anhydride-reactive groups such as amino groups and hydroxyl groups, or epoxide groups and hydroxyl groups, are condensation products of bisphenol-A-diglycidylether which contain hydroxyl groups, or reaction products of primary amines on bisphenol-A-diglycidyl ether.

b5) blends of the above, powdered, anhydride-reactive crosslinkers. With particular advantage, the blends contain at least 2 crosslinkers with varying reactivities. Here, a maximum of 49 equivalent percent of at least one monofunctional crosslinker is also preferable.

It is of advantage if the crosslinkers or mixtures thereof possess a functionality of 1.5 to 6, preferably between 2 and 4. In the mixtures according to the invention, the stochiometric relationship of anhydride groups to the above anhydride reactive groups, i.e. to the hydroxy-, amino- or epoxide groups, is advantageously between 0.2 and 5, preferably between 3 to 1 and 0.3 to 1.

In an advantageous way, the stability of the compositions according to the invention in their non-crosslinked condition will be higher if the compositions contain crosslinkers whose surface reactive groups are inactivated. Depending on the mean particle diameter and the distribution of particle size of the powdered crosslinker, with advantage from 0.1 to 15 and preferably from 0.5 to 10 equivalent percent of the originally existing reactive groups of the crosslinker will be inactivated.

Surface inactivation is carried out with advantage in a suspension of the crosslinker in a plasticizer or non-reactive solvent.

Solid di- or polyols with primary or secondary hydroxyl groups are surface inactivated through reaction with aliphatic, cycloaliphatic or aromatic isocyanates, diisocyanates or polyisocyanates and their prepolymers with polyols or polyamines, if necessary under the action of catalysts such as tertiary amines or tin compounds, acid chlorides of aliphatic or aromatic moncarboxylic acids or polycarboxylic acids, chloroformiates of mono-alcohols and polyols mono- or polyanhydrides of low molecular weight Mn compounds, if necessary under catalytic action of tertiary amines.

Solid, powdered di- or polyamines are surface inactivated through reaction with aliphatic, cycloaliphatic or aromatic isocyanates, diisocyanates or polyisocyanates, and their prepolymers with diols or polyols. Similar reactions are described in detail in EP 171 015, for example.

compounds containing acrylic groups by means of a Michael addition, in the case of aromatic amines under catalysis by means of acids.

Solid di- or polyepoxydes are surface inactivated through reaction with mono- or dianhydrides of low molecular weight Mn compounds, if necessary under the action of tertiary amines as a catalyst, aliphatic, cycloaliphatic or aromatic primary or secondary amines, polyamines, polyaminoamides.

For complete surface inactivation, an excess of inactivating agent must be used during reaction with the surface groups of the solid, suspended crosslinkers b1) to b4). During either storage or on heat curing, however, the remaining excess of this inactivating agent can later react uncontrollably with the anhydride groups or with any existing carboxyl groups of the polymers. The excess of acylating or alkylating compounds must be converted into a non-reactive form by means of reaction.

A stochiometric quantity of primary or secondary alcohols or amines can be used for the purposes of inactivation in the case of excess isocyanates, acid chlorides or chloroformiates. Primary aliphatic monofunctional alcohols are preferred.

A stochiometric quantity of compounds containing isocyanate can be used in the case of excess amines, with aliphatic or cycloapliphatic mono- and diisocyanates being preferred.

All these components, reactions and associated analytical methods for determining the excess of the surface inactivating agent are state of the art, and known to the expert in the art.

A mixture is here characterized as stable in storage when, at room temperature, the initial viscosity has not doubled within 48 hours and when the mixture has not gelled within this period of time, also in the presence of catalysts for curing.

While the reaction at temperatures above the melting point of the crosslinker between polymers containing anhydride groups and crosslinkers containing amino groups normally takes place rapidly and spontaneously, crosslinkers containing epoxy groups and hydroxyl groups require catalysts in order to react completely within a useful period of time and reach the desired final strength. Advantageous catalysts for crosslinkers containing epoxy groups and hydroxyl groups are tertiary amines or alkaline monocarboxylic acid salts in quantities up to 2 parts per 100 party binder/crosslinker.

Examples of catalytically effective tertiary amines are trialkylamines, preferably C12–C14-alkyldimethylamine, di-C12–C14-alkyl-methylamine, N-alkylimidazole, N,N,N', N'-tetramethyl-ethlenediamine and -1,3-butanediamine, diazabicyclo-octane (Dabco) and -undecene (DBU), compounds of DBU and monocarboxylic acids or phenoles, tetramethylguanidine, 4-dimethylamino-pyridine, 1,2,4-trimethylpiperazine, N,N'-dialkylpiperazine, N,N-dimethyl-benzylamine, N-alkylmorpholine, bis-(N-dialkylaminoethyl)ether, 2,2-dimorpholino-diethylether.

Potassium octoate is an example of an alkaline monocarboxylic acid salt.

It is advantageous if non-crosslinked, amine catalyzed compositions are protected until use from long-term infiltration of carbon dioxide from the ambient air in order to maintain the full effectiveness of the catalyzers.

The properties of the non-crosslinked and crosslinked compositions can be specifically controlled by a person skilled in the art, and depend for example on the polymer content, on the anhydride content of the polymer, on the degree of polymerization, on the proportion of comonomer, on the functionality, on the proportion of acid anhydride to functional groups of the crosslinker, on the type of functional groups and on additives. Various additives have a great influence on the various properties of the compositions in a liquid or crosslinked state, with examples from this group being inorganic and organic fillers, pigments, powdered metal, dyestuffs, carbon black, pyrogenic silica, short chopped fibres, powdered rubber, plasticizers, extender oils, bitumnen, resins, non-reactive polymers, reactive modifying agents, tackifying resins, adhesive additives, organofunctional silanes, surfactants, silicon oils, flame retarding additives, anti-oxydants and light stabilizers, anti-corrosion agents, scents, fungistatic and bacteriostatic agents, thixotropic agents, blowing agents and foam stabilizers, solvents and mixtures thereof. The effectiveness of these additives and their preferred concentrations are state of the art and known to the person skilled in the art. They enable him to use the compositions according to the invention for the manufacture of very soft to hard compositions with varying tear strength, tear propagation resistance, permanent set, glass transition temperature and chemical resistance. The method of manufacture of the compositions according to the invention on the basis of polymers containing acid anhydrides as binders, and with powdered crosslinkers with anhydride reactive groups dispersed in said polymers, comprises the careful homogenous mixing of the components while avoiding high shear stresses, with the maximum temperature being 55° C., thus remaining below the melting point of the undissolved, dispersed crosslinker. Mixing is preferably undertaken at room temperature. Intermediate storage can follow mixing if necessary.

A method can also be of advantage with which curing or crosslinking of the composition according to the invention is carried out in two stages, under the influence of heat, incorporating a mixture of two crosslinkers with differing melting points, solubility or reactivity. For example, chain extension can be carried out in an initial rapid reaction, with definitive crosslinking following in a slower reaction.

The use of powdered crosslinkers according to the invention for the manufacture of crosslinked compositions on the basis of polymers containing acid anhydride groups by curing or crosslinking of the liquid compositions according to the invention is carried out in a temperature range of 80° to 250° C., preferably 90° to 180° C., either through the application of heat, the generation of heat within the composition, or in the substrate.

The mixtures according to the invention are used for the manufacture of casting compounds, extrusion compounds, grouting compounds, coatings, adhesives and sealants.

EXAMPLES

Definitions: "%" means "percentage weight", "T" means "proportions of mass".

Acid number: The acid number was determined with methanolic potassium hydroxyde. One acid group and one methylester will form per anhydride group.

Mechanical testing: Tear resistance was determined according to DIN 53 504, and tear propogation resistance according to DIN 53 507. Withdrawal speed 100 mm/Min. Indentation hardness was determined with Shore A-test apparatus.

Table 1: Materials Used

Polymers

Lithene LX16-10MA; liquid, maleinized polybutadiene with 9.09 % maleic anhydride, acid number 54 mg KOH/g, Mn 8800 (Revertex Ltd. UK-Harlow)

Lithene LX16-5MA; liquid maleinized polybutadiene with 4.76% maleic anhydride, acid number 28 mg KOH/g, Mn 8800 (Revertex Ltd. UK-Harlow)

Lucant A 5560; liquid, EPDM maleinized by graft reactions, Mn 2600, acid number 28 mg KOH/g (Mitsui Petrochemical Ind., Japan)

Plasticizers

Nyflex 810; naphthenic process oil (AB Nynäs Petroleum, S-Nyeshamn)

Vestinol 9; diisononylphthalate (Hüls AG, D-Marl) Santicizer 261; benzyloctylphthalate (Monsanto Europe SA, B-Brussels)

Crosslinkers

Dianol 220; ethoxylated bisphenol A, (AKZO Chem. Div. NL-Amsterdam)

THEIC; trishydroxyethylisocyanurate (BASF AG, D-Ludwigshafen)

PE-200; pentaerythrite (Hercules Inc.; USA-Wilmington)

HQEE; hydroquinone-di(2-hydroxyethyl)-ether (Eastman Chemical Prod., INC., USA-Kingsport)

NPG; neopentylglycol (Eastman Chemical Prod., INC., USA-Kingsport)

Araldite PT 810; triglycidylisocyanurate, (Ciba-Geigy AG, CH-Basel)

Polacure 740, trimethylenglycol-di-p-aminobenzoicester (Air Products, NL-Utrecht)

DABAN; 4,4'-diaminobenzanilide (Nobel Chemicals, S-Karlskoga)

Catalysts

C12−C14-alkyldimethylamine (BASF AG, D-Ludwigshafen)

Additives

Phenolic anti-oxydants (Vulkanox BKF, Bayer AG, D-Leverkusen) Desmodur E-23; MDI-polyetherprepolymer, 15.4 % NCO, Equivalent 273 g, (Bayer AG, D-Leverkusen)

Fillers

Calcium carbonate, precipitated, surface treated, average particle size 80 nm (Socal U1S1, Solvay B-Brussels) Molecular Sieve powder, Type 4A (Purmol, Chemie Uetikon AG, CH-Uetikon)

TABLE 2 heat curing crosslinkers for polymers containing anhydride groups

| | melting-point °C. | OH—/NH number mg KOH/g | equivalent grams |
|---|---|---|---|
| HQEE | 98 | 555 | 101 |
| Dianol 220 | 108 | 350 | 160 |
| NPG | 127 | 1078 | 52 |
| THEIC | 133 | 645 | 87 |
| PE-200* | 253 | 1220* | 46* |
| TGIC | 86 | — | 107 |
| Polacure 740 | 130 | 357 | 157 |
| DABAN | 206 | 496 | 113 |

*Assumption: 3 reactive hydroxyl groups available per mol pentaerythrite

TABLE 3 transparent formulations

| Formulation | grams |
|---|---|
| (1) Lithene LX 16-10MA | 1000 |
| (2) Nyflex 810 | 428 |
| (3) Tertiary amine | 0.4 |
| (4) Solid crosslinkers, as listed below | |

| | Experiment No. | | | | | | | |
|---|---|---|---|---|---|---|---|---|
| | 1 | 2 | 3 | 4 | 5 | 6 | 7 | 8 |
| Pentaerythrite* | 44 | | | | | | | |
| THEIC | | 81 | | | | | | |
| Dianol 220 | | | 148 | | | | | |
| NPG | | | | 50 | | | | |
| HQEE | | | | | 97 | | | |
| TGIC | | | | | | 103 | | |
| Polacure 740** | | | | | | | 151 | |
| DABAN** | | | | | | | | 108 |
| Storage stability at room temp., days | >30 | >30 | 7 | 3 | 25 | >30 | >30 | >30 |
| Shore A | 50 | 45 | 35 | 32 | 36 | 38 | 57 | 53 |
| (after stochiometric crosslinking at 145° C. for 10 minutes) | | | | | | | | |

*Assumption: 3 Equivalents OH/Mol
**without tertiary amine

TABLE 4

Formulations/Results

| | Experiment No. | | | |
|---|---|---|---|---|
| | 9 | 10 | 11 | 12 |
| (1) Lithene LX 16-5MA | 1000 | 1000 | | |
| (2) Lithene LX 16-10MA | | | 1000 | 1000 |
| (4) Santicizer 261 | | 658 | 658 | |
| (5) Vestinol 9 | 455 | | | |
| (6) Socal U1S1 | 766 | 766 | 766 | 766 |
| (7) Purmol 4A | 23 | 23 | 23 | 23 |
| (8) Vulkanox BKF | 5 | 5 | 5 | 5 |
| (9) Nyflex 810 | 203 | | | 658 |
| (10) PE 200 | 22 | 22 | 44 | |
| (11) HQEE | | | | 97 |
| (12) Tertiary amine 10% solution in (9) | 4 | 4 | 4 | 4 |
| Total | 2478 | 2478 | 2500 | 2553 |
| Stability at room-temperature, days | >40 | >40 | >40 | >20 |
| Crosslinking temp. °C. | 145 | 130 | 130 | 120 |
| Shore A | 38 | 32 | 55 | 52 |
| Tensile strength N/mm2 | 0.84 | *** | 1.36 | 1.44 |
| Elongation % | 55 | *** | 35 | 36 |

TABLE 4-continued

| Formulations/Results | | | | |
|---|---|---|---|---|
| Tear strength. N/mm | 0.62 | *** | *** | 0.88 |

***not determined

TABLE 5

| Formulations/Results | | | | |
|---|---|---|---|---|
| | Experiment No. | | | |
| | 13 | 14 | 15 | 16 |
| (2) Lithene LX 16-5MA | 1000 | 1000 | 1000 | |
| (3) Lithene LX 16-10MA | | | | 1000 |
| (4) Vestinol 9 | 455 | | 455 | 455 |
| (5) Nyflex 810 | | 455 | | |
| (6) Socal U1S1 | 766 | 766 | 766 | 766 |
| (7) Purmol4A | 23 | 23 | 23 | 23 |
| (8) Vulkanox BKF | 5 | 5 | 5 | 5 |
| (9) Nyflex 810 | 203 | 203 | 203 | 203 |
| (10) DABAN <200 μm | 55 | 55 | 55 | |
| (11) Polacure 740 | | | | 150 |
| (12) Desmodur E-23 | | | 13 | |
| (13) Butylglycol | | | 6 | |
| Total | 2507 | 2507 | 2526 | 2602 |
| Stability at room-temperature, days | <3 | >40 | >40 | >40 |
| Crosslinking temp. °C. | 120 | 135 | 125 | 120 |
| Shore A | 42 | 39 | 44 | 58 |
| Tensile strength N/mm2 | 1.87 | 1.60 | 1.78 | 2.49 |
| Elongation % | 101 | 93 | 108 | 56 |
| Tear strength. N/mm | 1.32 | *** | 1.36 | 1.46 |

***not determined

With regard to experiment 15: stabilisation of the solid amines with isocyanate-prepolymer:

55 g DABAN (4,4'-diaminobenzanilide, 0.486 Equivalents) were dispersed in 158 g of Nyflex 810 naphthenic oil and reacted with 13 g Desmodur E-23 (approx. 0.049 Equivalents). After 24 hours reaction time at room temperature, any existing excess of isocyanate prepolymer was reacted to give urethane by adding 6 g butylglycol (0.05 Equivalents). This dispersion of surface inactivated DABAN was then mixed into the remainder of the formulation.

The mixture was introduced into the recessed groove of a sheet metal can lid and oven-cured for 5 minutes at 145° C. An elastic sealing composition resulted, exhibiting good resilience.

A comparison of the storage stability of experiment 15 with that of experiment 13 shows the considerably improved storage-stability at room temperature of the surface inactivated, solid crosslinker when mixed with the polymer containing anhydride groups.

TABLE 6

| Formulations/Results | | |
|---|---|---|
| | Experiment No. | |
| | 18 | 19 |
| (1) Lithene LX 16-5MA | 1000 | |
| (2) Lucant A 5560 | | 1000 |
| (3) Vestinol 9 | 455 | 455 |
| (4) Socal U1S1 | 766 | 766 |
| (5) Purmol4A | 23 | 23 |

TABLE 6-continued

| Formulations/Results | | |
|---|---|---|
| (6) Vulkanox BKF | 5 | 5 |
| (7) Nyflex 810 | 203 | 203 |
| (8) TGIC PT 810 | 51 | |
| (9) Tertiary amine 10% solution in (7) | 4 | |
| (10) DABAN <200 μm | | 55 |
| Total | 2507 | 2507 |
| Stability at room-temperature, days | >40 | >40 |
| Crosslinking temp. °C. | 130 | 120 |
| Shore A | 25 | 41 |
| Tensile strength N/mm2 | 0.72 | *** |
| Elongation % | 41 | *** |

***not determined

Inasmuch as the invention is subject to modifications and variations, the foregoing description and accompanying examples should not be regarded as limiting the invention, which is defined by the following claims and various combinations thereof:

I claim:

1. A liquid composition, which is stable in storage at room temperature and which crosslinks under the action of heat, comprising:

a liquid binder polymer containing acid anhydride groups and at least one powdered crosslinker with a melting point above 60° C. having more than one anhydride-reactive group per molecule dispersed in said liquid composition, said anhydride-reactive groups being not inactivated by inactivation of surface-reactive groups of the powdered crosslinker, said crosslinker being inactive and not soluble in the binder polymer at ambient conditions, and said crosslinker being able upon application of heat to said crosslinker to crosslink the binder polymer containing the anhydride groups at temperatures of 80° C. and above, wherein the powdered crosslinker is selected from the group consisting of:

b1) solid di- or polyols with primary or secondary hydroxyl groups selected from the group consisting of mannite, sorbite, sucrose, lactose, erythrite, pentaerythrol, di-pentaerythrol, tri-pentaerythrol, solid pentaerythrol derivatives with ester groups and on average at least two free hydroxyl groups, solid pentaerythrol derivatives with ether groups and on average at least two free hydroxyl groups, neopentylglycol, hydroquinone-bis-(2-hydroxyethyl) ether, oxoethylated bisphenol A, oxoethylated terephthalic acid bisamide, tris-(2-hydroxyethyl)isocyanurate, N,N'-bis-(2-hydroxyethyl)piperazine, solid polyesters containing hydroxyl groups, reaction products of di- or polyisocyanates with short chain dioles or amino alcohols and solid polymers or copolymers containing hydroxyl groups;

b2) solid di- or polyamines selected from the group consisting of sterically hindered, aromatic diamines, ethyleneglycol-di-p-aminobenzoic ester, trimethylenglycol-di-p-aminobenzoic ester, 4,4'-diaminobenzophenone, 4,4'-diaminobenzanilide, 4,4'-diaminophenylsulphone, N,N'-di-anilino-urea, piperazine, solid reaction products of short chain mono- and diamines on diisocyanates or polyisocyanates, solid reaction products of short chain mono- and diamines on diepoxides or polyepoxides and solid reaction products of monomeric anhydrides and polyamines;

b3) solid di- or polyepoxides;

b4) solid compounds which carry different anhydride reactive groups; and b5) mixtures thereof.

2. A composition according to claim 1, wherein the melting point of the crosslinker is at least 80° C.

3. Composition according to claim 1, wherein the particle size of the crosslinker is up to 500 μm.

4. Composition according to claim 1, wherein the crosslinker is selected from the groups of the di- or polyamines, di- or polyols, di- or polyepoxydes, compounds with different anhydride-reactive groups or mixtures thereof.

5. Composition according to claim 1, wherein the functionality of the anhydride-reactive crosslinker or of the mixtures of crosslinkers amounts to 1.5 to 6.

6. Composition according to claim 1, wherein that said composition contains at least 2 crosslinkers with different reactivities.

7. Composition according to claim 1, wherein said composition contains a maximum of 49 equivalent percent of a monofunctional anhydride-reactive crosslinker.

8. Composition according to claim 1, wherein the binder is selected from the group consisting of copolymers of maleic acid anhydride or itaconic acid anhydride with olefinic unsaturated monomers, addition products of unsaturated anhydrides on polymers with individual or conjugated double bonds, addition products of unsaturated anhydrides on unsaturated decomposition products of high molecular weight (Mn) natural rubber, styrene-butadiene rubber, or thermoplastic styrene-butadiene-isoprene rubber, addition products which have been obtained by radical graft reactions of olefinic unsaturated anhydrides on a liquid polymer, polymeric esteranhydrides, thioesteranhydrides or amidanhydrides of polyhydroxyl compounds, polymercapto compounds, of polyamines with trimellitic acid anhydride, pyromellitic acid dianhydride, benzenetetracarboxylic acid dianhydride, benzophenone tetracarboxylic acid dianhydride and mixtures of these binders.

9. Composition according to claim 8, wherein the binder is a reaction product of maleic acid anhydride on polymers or copolymers of polybutadiene.

10. Composition according to claim 8, wherein the binder is at least one polymer with a number average molecular weight Mn of 500 to 50,000 Daltons, which contains an average of 1.5 to 10 anhydride groups per molecule.

11. Composition according to claim 8, wherein the binder is a mixture of polyfunctional and monofunctional polymers containing anhydride groups with an average content of at least 1.5 anhydride groups per molecule.

12. Composition according to claim 8, wherein the proportion of the anhydride-reactive groups of the crosslinker to the acid anhydride groups of the binder is in the range of 0.2 to 5.

13. Composition according to claim 8, wherein the binder can contain other functional groups in addition to anhydride groups.

14. Composition according to claim 8, wherein the composition, in relation to 100 parts weight of binder and crosslinker, contains up to 2 parts weight of at least one catalyst from the groups of tertiary amine or alkaline carboxylic acid salt.

15. Composition according to claim 1, wherein said composition contains the additives from the groups of inorganic or organic fillers, pigments, powdered metal, dyestuffs, carbon black, pyrogenic silica, short choped fibers, powdered rubber, plasticizers, extender oils, bitumen, resins, non-reactive polymers, reactive modifiers, tackifying resins, adhesive additives, organofunctional silanes, surfactants, silicon oils, flame retarding additives, antioxydants, light stabilisers, anti-corrosion agents, scents, fungistatic and bacteriostatic agents, thixotropic agents, blowing agents and foam stabilisers, solvents and mixtures thereof.

16. Method of manufacture of compositions according to claim 1, wherein the components are homogenously mixed at temperatures up to a maximum of 55° C. and if necessary are placed in intermediate storage.

17. Method according to claim 16, wherein at least two crosslinkers are used and where the reactivities of the at least two an hydride-reactive crosslinkers are different.

18. A powdered, anhydride reactive crosslinker suitable for the manufacture of storage-stable compositions which crosslinks under the action of heat and which compositions are based on liquid polymers containing acid anhydride groups which contain these crosslinkers, said crosslinker being capable of melting or dissolving through the application of heat and, under further application of heat, crosslinking the polymers containing said acid anhydride groups at temperatures between 80° to 250° C.

19. Compositions according to claim 1 for the manufacture of casting compounds, extrusion compounds, coatings, adhesives and sealants.

20. A liquid composition according to claim 1, further comprising at least one catalyst.

21. A liquid composition according to claim 1, further comprising additives.

* * * * *